APPARATUS FOR TESTING ELECTRICAL COMPONENTS

Original Filed March 22, 1961 4 Sheets-Sheet 1

INVENTOR
J. W. McGRATH
By W. L. Johnson
ATTORNEY

APPARATUS FOR TESTING ELECTRICAL COMPONENTS

Original Filed March 22, 1961 4 Sheets-Sheet 2

APPARATUS FOR TESTING ELECTRICAL COMPONENTS

Original Filed March 22, 1961 4 Sheets-Sheet 3

INVENTOR
J. W. McGRATH
By W. Johnson
ATTORNEY

APPARATUS FOR TESTING ELECTRICAL COMPONENTS

Original Filed March 22, 1961 4 Sheets-Sheet 4

INVENTOR
J. W. McGRATH
By W. Johnson
ATTORNEY

United States Patent Office

Re. 25,894
Reissued Nov. 2, 1965

25,894

APPARATUS FOR TESTING ELECTRICAL COMPONENTS

John W. McGrath, Allentown, Pa., assignor to Western Electric Company, Incorporated, New York, N.Y., a corporation of New York Original No. 3,106,290, dated Oct. 8, 1963, Ser. No. 97,509, Mar. 22, 1961. Application for reissue Oct. 16, 1964, Ser. No. 418,366
12 Claims. (Cl. 209—81)

Matter enclosed in heavy brackets [ ] appears in the original patent but forms no part of this reissue specification; matter printed in italics indicates the additions made by reissue.

This invention relates to apparatus for testing electrical components, particularly semi-conductor devices and electron tubes.

Millions of components of this type are manufactured annually and, of course, they must be tested prior to being used. However, there are variations in the characteristics of certain of the components that make it desirable to submit them to numerous tests and to classify or sort them in known code groups. The provision of individual and independent testing means for each code requirement would require not only numerous individual testing and sorting units but considerable time, not only for each test but in transporting the components from one testing area to another. It has been found advantageous, therefore, and it is the object of the invention to provide an apparatus capable of making variable and numerous successive tests on electrical components and to sort them according to the results of the tests.

In accordance with the object, the invention comprises means for testing electrical components having external leads and to sort them according to their different characteristics.

More specifically, the apparatus includes a series of supports movable in a given path to carry holders for the components into successive test stations where test units are mounted and adapted for the inclusion of the leads of the components in test circuits. Each support has a series of indicating elements movable between accept and reject positions and responsive to actuators rendered effective at the various stations if the components are rejected as a result of tests, so that in another area, the components may be sorted according to their codes or electrical characteristics.

Other objects and advantages will be apparent from the following detailed description when considered in conjunction with the accompanying drawings wherein:

FIG. 8 is a wiring diagram of one of the ejecting circuits.

Figure 1:
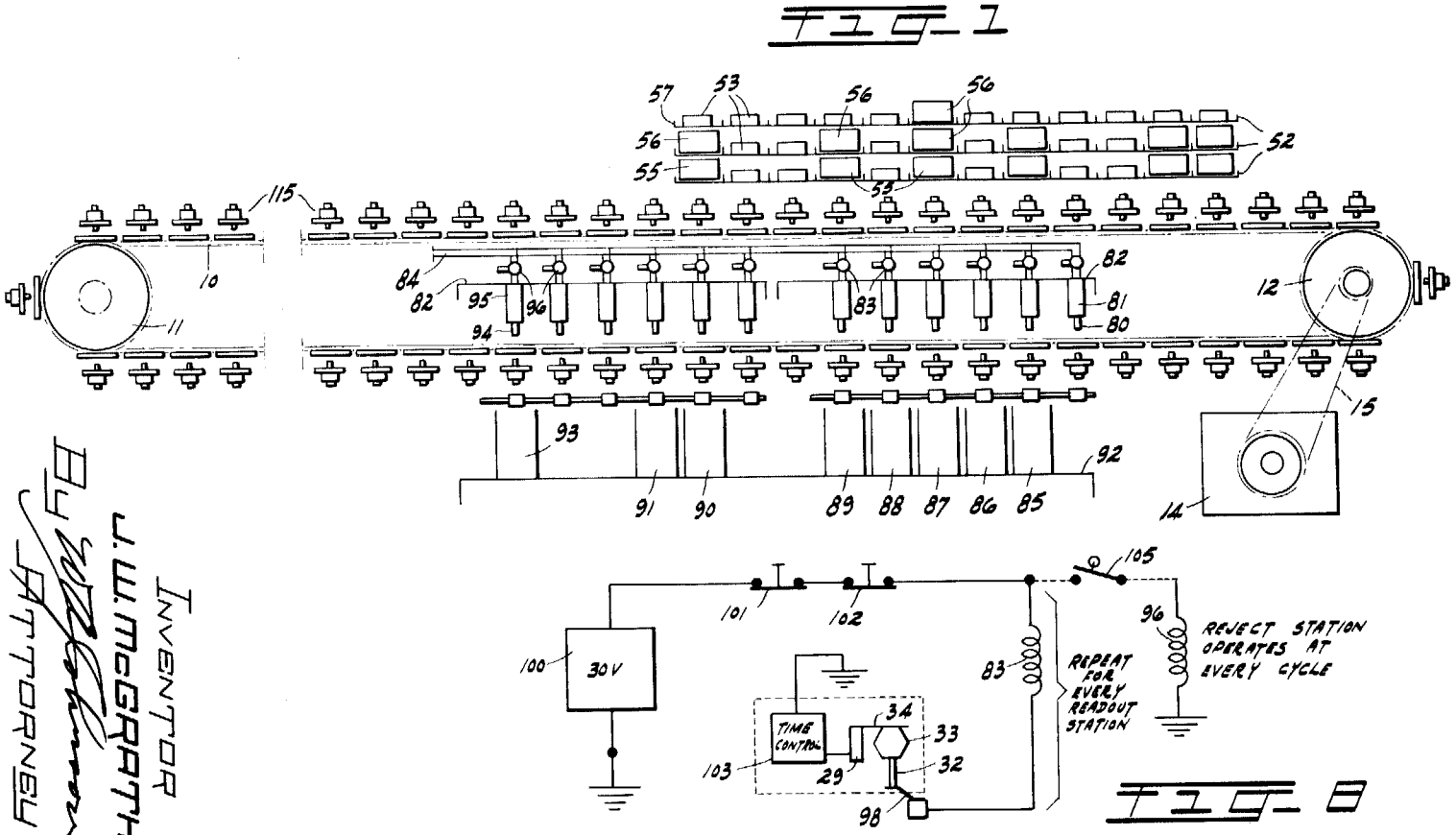
FIG. 1 is a schematic front elevational view of the apparatus.

The apparatus includes an endless conveyor which, in the present instance, is a pair of spaced endless chains 10 extending around pairs of sprockets 11 and 12, the sprockets 12 being driven intermittently by a power means 14 through a connection 15. The power means 14 may be any suitable drive including, for example, an electric motor driving a suitable escapement mechanism such as a cam or Geneva unit to advance the conveyor a given distance between each interval of rest.

Figure 2:
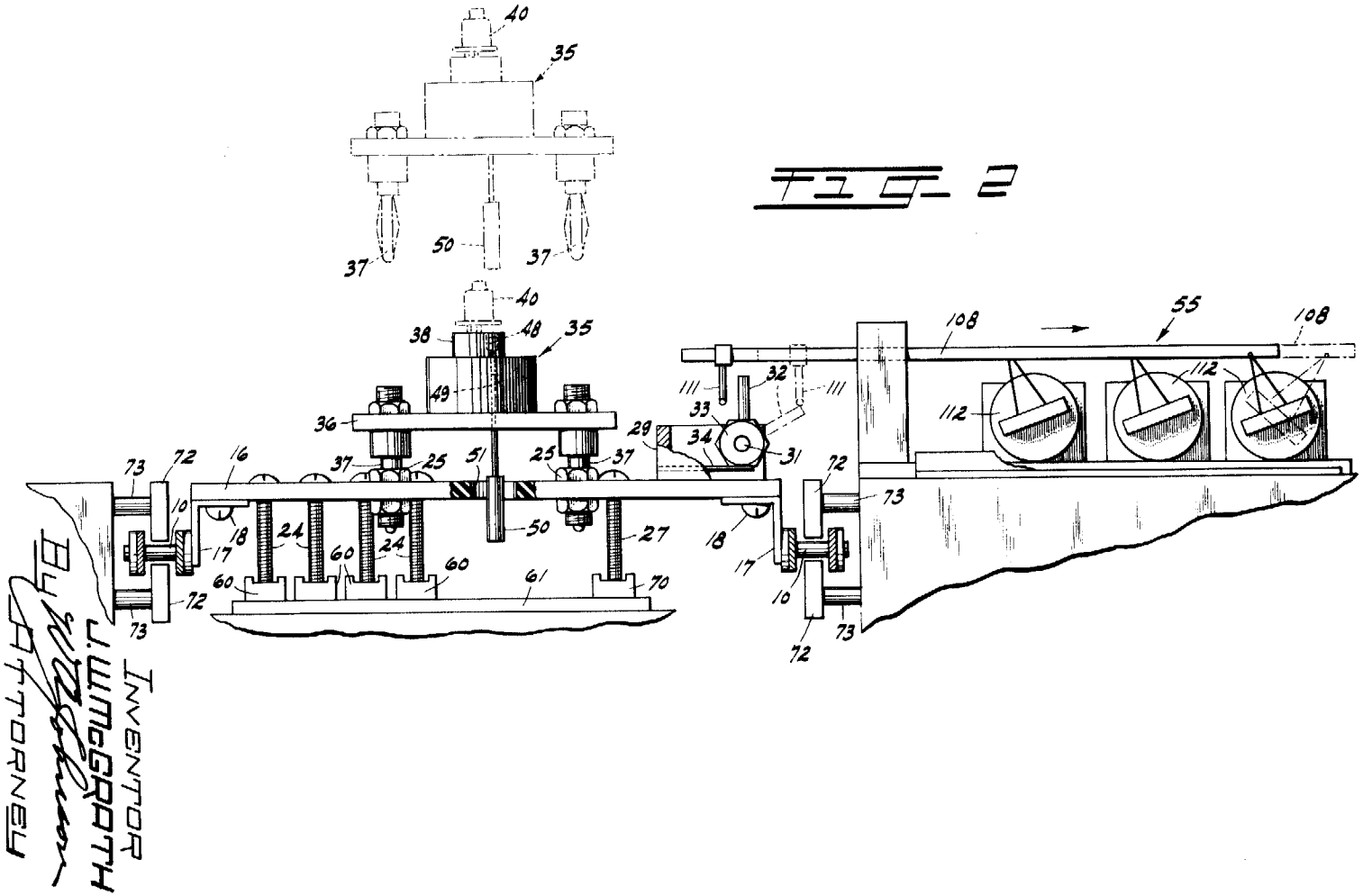
FIG. 2 is a fragmentary detail view of a portion of the apparatus showing the component holder in solid lines in mounted position and in broken lines prior to being mounted on its support.
Figure 5:
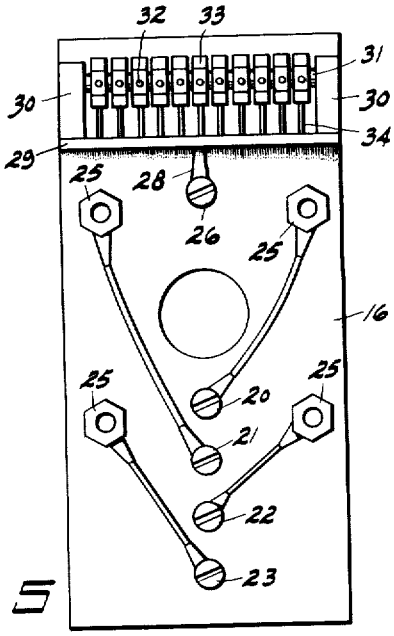
FIG. 5 is a top plan view of one of the supports.

In the present instance, there are 81 supports 16 formed of a dielectric material and connected to inner links of the chains 10 through the aid of brackets 17. The brackets are attached to the chain links and secured by the aid of studs 18 to the supports 16. The supports are identical, each having a series of four terminals 20, 21, 22, and 23 having conductive elements such as springs 24 with their upper ends connected firmly to the terminals and extending downwardly from the undersurface of their support 16. The terminals 20 to 23, inclusive, on the upper surface of the support are connected electrically to conductive sockets 25, as illustrated in FIG. 5. Another terminal 26 of the support 16 has a conductive element 27 in the form of spring with its upper end fixed to the terminal and extending downwardly, as illustrated in FIG. 2. The terminal 26 is connected electrically at 28 to a frame 29 which is mounted on the support 16 and has end members 30 supporting a spindle 31.

In the present instance, eleven indicating elements 32, mounted on their individual hexagonal supports 33 *and advantageously composed of conductive material,* are supported by the spindle 31 for rotation between accepted positions shown in solid lines in FIG. 2 and rejected positions shown in broken lines in this figure. The term "accepted" is used to indicate that the component has passed a test associated with that indicating element and the term "rejected" implies that as a result of that particular test, the component was rejected. There are wire type springs 34 each with one end held by the frame 29 and the free end forced against its hexagonal support 33, or a flat surface thereof, to hold its indicating element 32 in either the passed or rejected position.

Figure 6:
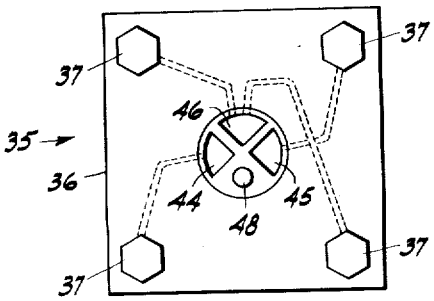
FIG. 6 is a top plan view of one of the component holders.

A component holder, indicated generally at 35, includes a dielectric member 36 on which four conductor plugs 37 are mounted for [interengagement with] *insertion into* the sockets 25 of [its] *a* support 16. A dielectric socket 38 for a component 40 having three external leads 41, 42, and 43 is provided with three tapered apertures 44, 45, and 46 for receiving the leads 41 to 43, inclusive. The conventional conductive elements are mounted in the apertures 44 to 46 inclusive, and are electrically connected to the plugs 37, as illustrated in FIG. 6. Each holder 35 has an ejector 48 supported for vertical movement in an aperture 49 and provided with an enlarged end 50 extending through an aperture 51 in the support 16.

Figure 4:
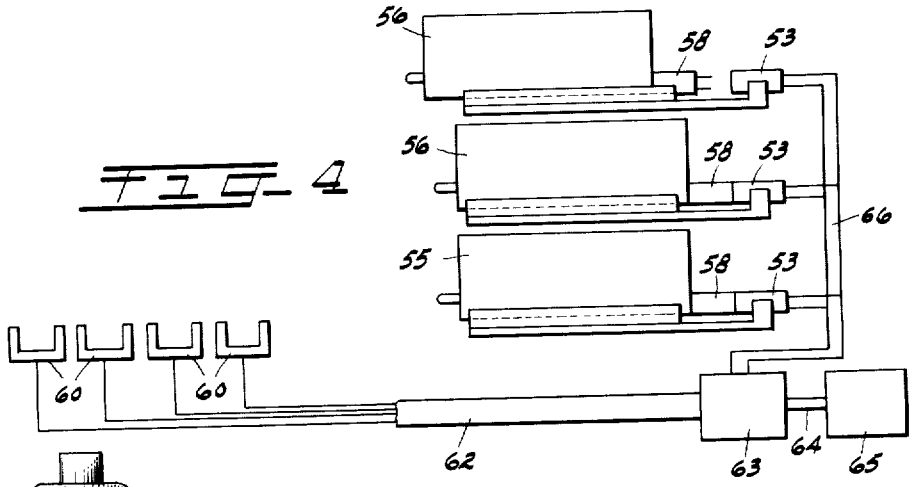
FIG. 4 is a fragmentary vertical elevational view taken at one of the test stations.
Figure 7:
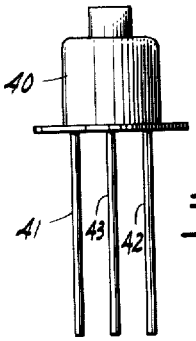
FIG. 7 is a front elevational view of one of the components.

In the present illustration (FIG. 1) there is a plurality of shelves or supports 52 mounted at fixed positions adjacent the conveyor 10. The front edges of the shelves are located in a vertical plane adjacent to, parallel with but back of the conveyor 10. Each shelf has numerous locations for test sets and each location [being] *is* provided with socket-like connectors 53. The bottom shelf or support 52 and its connectors 53 are for actuator units 55, while the intermediate and upper shelves are for test sets 56. The unit 55 and the test sets *56* are purposely made of like widths so that accurately spaced guide rails 57, mounted on the shelves or supports 52, may guide plug-like associate connectors 58 into accurate [interengagement] *engagement* with the socket-like connectors 53. The sockets 53 are defined as connectors and the plugs 58 as associate connectors [as they] *, and they function to* connect their respective units 55 or 56 into circuits which are arranged particularly in their respective units to perform desired tests of the components. The areas of the test sets 56 and their respective actuator units 55 may be defined as test stations and the driving means for the conveyor is controlled so that during the intervals of rest, a support *16* will be located at each test station. Furthermore, there are conductive members 60 of somewhat channel form mounted on a dielectric support 61 for engagement with the conductive elements 24 so that, as illustrated in FIG. 4, these elements and the leads of the component at each station may be included in the desired circuits at those stations. The schematic illustration in FIG. 4 shows connection of the conductive members 60 through leads of a cable 62 to a panel 63. The panel 63 has suitable connections for a cable 64 to various sources of electrical energy 65. Another cable 66 extending from the panel 63 provides connections with, and between, the various connectors or sockets 53 so that desired electrical energy may be supplied to the test units 56 and from the test units to the actuator unit 55, in each instance, depending upon the results of each test.

Figure 3:
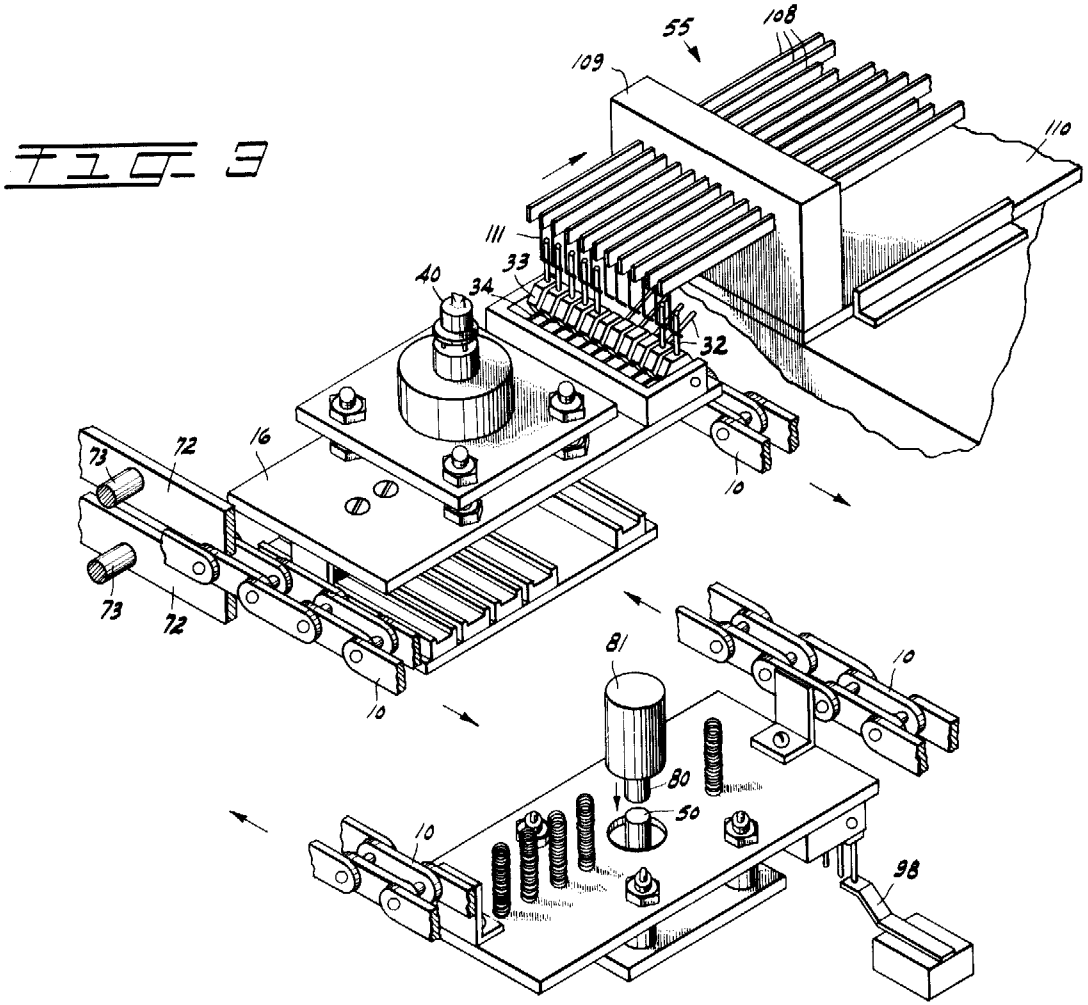
FIG. 3 is a fragmentary isometric view of upper and lower portions of the apparatus.

A conductive member 70, mounted on the dielectric member 61, is positioned to be engaged by each conductive element 27 at each test station. A particular guide means is provided for the conveyor to assure accurate positioning of the supports as they move into and through the test stations. This means is shown in FIGS. 2 and 3 as being composed of pairs of parallel guides 72, fixedly mounted at 73, so that the chains may be supported therebetween. Similar means is provided for the return portion of the conveyor, particularly in the ejecting area.

The final *test* information stored in what may be called the memory unit of each support, [including] *i.e.*, the indicating elements 32, [resulting from the various tests,] remains throughout the remainder of the cycle of the apparatus and particularly through the sorting and rejecting area. This area includes a part of the return portion of the conveyor, the supports with the holders having been inverted as they move about the sprockets 12. There are numerous fluid operable plungers 80 of cylinders 81 secured to supports 82 and disposed in alignment with the portions 50 of the ejectors 48 of the holders 35 positioned therebeneath when the apparatus is at rest. Each cylinder 81 is connected to a solenoid operable valve 83 to connect and disconnect the cylinder in each instance with a supply line 84 for fluid under pressure. In the present instance, the fluid is air under pressure and the plungers 80 have suitable means such as internal springs disposed in their cylinders 81 to hold the plungers normally upwardly in the position shown. When the valves 83 are operated through energization of their solenoids, the plungers will move downwardly to engage the portion 50 of the ejector 48, as illustrated in FIG. 3, to cause downward movement of the ejector a distance sufficient to force the component free of the holder.

In the present instance, there are seven code receptacles 85, 86, 87, 88, 89, 90, and 91 disposed on a support 92 beneath a selected number of the plungers 80 which are conditioned to be responsive to eight of the memory pins or indicating elements 32. A reject receptacle 93 is also mounted on the support 92 beneath a plunger 94 of a cylinder 95 whose solenoid valve 96 is operated after each interval of rest to assure ejection of any component which may remain in any of the holders.

FIG. 8 illustrates a schematic diagram of identical circuits for all of the valves 83, [with exception of the valve 96, as] *the circuits* being under the control of [switches] *conductive members* 98 disposed [in their respective positions so] *such* that during each interval of rest, the [switches] *conductive members* 98, although in the path of all of the indicating elements which may be in their accepted positions, are [located to be] engaged by only their respective pin or indicating element 32 [when the conveyor comes to rest]. This circuit, in each instance, includes a grounded source of electrical energy 100 in a line with switches 101 and 102. The switches 101 and 102 may be operated manually to respectively condition closing and opening of the circuits (FIG. 8) through the solenoid winding of its valve 83, the [switch] *conductive member* 98, the indicating element 32, its support 33, spring 34, and frame 29, and through a time control delay unit 103 to ground. The [switches] *conductive members* 98 positioned in the areas of the receptacles 85 to 91 inclusive, FIG. 1, will be [operated closed] *engaged* momentarily by all indicating elements 32 remaining in the accepted positions. However, *as previously mentioned*, the [switches] *conductive members 98* are located [to be held closed] *so as to be engaged only* by their respective indicating elements 32 when the conveyor is at rest, *which* [a] length of time [necessary] *is sufficient* for the time control delay units 103 to complete the circuits through the *engaged* [switches] *conductive members* 98 and their solenoid windings 83, FIG. 8. The circuits for all of the eight plungers 80 which are to be active are closed and the circuits for the plungers which are not being used at present, are opened by switch 102. The circuit for the plunger 94 includes only a source of electrical energy such as 100, in a grounded circuit with the winding of the solenoid valve 96 and a suitable operable switch 105 closed after each movement of the conveyor to cause operation of the plunger 94.

Each test station being employed and using one or more test units *56* utilizes an actuator unit 55. The test units *56* are conditioned in a conventional manner to perform predetermined electrical tests on the components and to close a predetermined number of circuits for their actuator units *55* when the components fail any of the tests. It is the closing of these circuits by conventional electrical means which control the actuators. The actuator units 55 vary depending upon the number of indicating elements 32 they are to control in response to their respective test units. In FIG. 3, eleven actuating rods 108 are shown slidably supported in apertures of a vertical member 109 of a frame 110 of the actuator unit, thus providing one rod 108 for each indicating element 32. In this instance, and at this station, a test is made which all components must pass, otherwise they are rejected and regardless of the results of subsequent tests, such components are not accepted. At the beginning, if only seven tests are performed, the unused elements 32 on each support are moved to their rejected positions. Each rod 108 is positioned free of the indicating elements 32 when moved with the conveyor and is provided with actuating fingers 111 positioned to engage its indicating element and move it from the vertical or accepted position, shown in solid lines, to the rejected position, shown in broken lines in FIG. 2. The rods 108 are connected to their respective solenoids 112, which are of the angular rotation type, and when energized by the closing of the circuits by the test sets, resulting from the components failing to pass any of the [test] *tests*, will move the rods longitudinally, as illustrated in FIG. 2. If desired, the illustration in FIG. 3 with eleven rods, one for each indicating element 32, may be modified to include the two outer rods with a connecting bar joining the actuating fingers 111 thereof adapting the two bars, following energization of their solenoids, to move all of the indicating elements into the rejected positions. Other actuating units 55 follow this same principle using, however, only the desired number of rods 108 with fingers 111 to actuate their respective indicating elements 32 into rejected positions when their respective solenoids 112 are energized.

All of the test units are arranged and constructed so that they will perform their particular test on each component when moved into their respective test station and will leave the indicating element or elements associated therewith undisturbed if the components pass those particular tests. However, the test units are adapted to cause energization of the one or more solenoids 112 of their actuating units, if the component fails to pass the particular test.

OPERATION

The conveyor of the apparatus is of sufficient length to provide a loading area 115 where the components may be loaded into the holders either manually or automatically. The holders are constructed, as illustrated in FIG. 6, so that the components, in the present instance, with the three leads, may be loaded only in the correct manner and when positioned in the holders, they will be held firmly through the frictional contact of the leads with conductive elements of the holders so that the components will not fall out of the holders on their return movement in their inverted positions.

In the present instance, the advancing motion of the conveyor is timed at ½ second, while the rest or testing interval is 1½ seconds, the maximum time required for the longest test. It should be apparent that the testing apparatus is capable of performing numerous and varied tests on varied types of components and provided with not only a plurality of test stations, but equipment in each station to perform single or numerous tests. Furthermore, when the numerous tests to be made on the components are determined, they may be made in any desired order. The circuits of the test sets 56 are connected through their plug portions 58 to predetermined associate connectors 53 (FIG. 4) so that by the mounting of these test units in any of the test stations the test units are rendered effective to carry out their particular tests as soon as a component is moved into the test station thereof. When each support 16 with its holder 35 is moved into a test station, the conductive elements 24, engaging the conductive members 60, complete the inclusion of the component electrically into the test circuit or circuits at that station.

In the present instance, eight tests are made, one to determine if the components are acceptable for any code and the others to test the components for their particular codes and to divide them accordingly into their respective codes by the storing of the memory of or the results of the tests in their particular indicating elements 32 so that during the return movement of the components in their inverted positions, they will be ejected in their particular receptacles 85 to 91, inclusive, or if they have failed all of the tests [or the particular test], they will be ejected into the receptacle 93.

The conveyor moves the holders with their components successively between the known intervals of rest so that during the forward movement the components will be included electrically in each of the single or series of test units *56* at the successive test stations. If a component passes all the tests its respective indicating elements *32* will remain undisturbed in their vertical positions and the components will be ejected to drop into the receptacle 85 where the perfect components, *i.e., those meeting the requirements of all the codes,* will be deposited. However, if a component should fail the first test, which all components must pass, all of its indicating elements *32* will be moved into the rejected positions to cause it to be deposited in the receptacle 93. This condition causes the first test unit to energize its solenoids 112 to move the associated rods 108 to move all the indicating elements for the rejected component into their rejected positions. If, however, the components pass the first test but fail one or more of the remaining tests, only the actuator units *55*, associated with the test units *56* where the components have failed the tests, will be operated to cause movement of the respective indicating elements *32* into their rejected positions. As a result of these actions, during the return movement of the holders with their components, the perfect components will be ejected to drop in the receptacle 85, the other acceptable components will be sorted by being deposited in the receptacles 86 to 91 inclusive according to their determined weaknesses and those undesirable for use deposited in the receptacle 93.

FIGS. 2 and 4 illustrate the inclusion of each component electrically into the test units *55* at each test station. FIGS. 2 and 3 illustrate the actuator unit features for moving the indicating elements *32* into the rejected positions when their components fail the tests. The ejection of the components above the various receptacles is illustrated in FIG. 3 and one of the various control circuits for operating the ejecting means through energization of the solenoid valve 83 is shown in FIG. 8.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for testing electrical components having external leads, a series of supports movable in a given straight line forward path, holders for components and their leads mounted on the supports, a plurality of electrically operable test units mounted successively adjacent the path, means to move the supports successively between intervals of rest to the test units, means to electrically connect the leads of the components to the test units, *a memory unit associated with each support, each memory unit including* a series of [conductive] indicating elements mounted in a row on each support and movable individually between accepted and rejected positions, and [actuators responsive to their respective test units when the components fail to pass any of the tests to move their respective indicating elements into its rejected positions] *means associated with each test unit and operable in response thereto when a component fails a test to move at least one of the indicating elements associated with said component to its rejected position.*

2. An apparatus according to claim 1 in which *the supports are movable in a given straight line return path, and further including* receptacles corresponding respectively to the [same individual] indicating elements of each holder [are] disposed [in their respective order] *successively* beneath [a straight line] *the* return path of the [holders] *supports,* and means [responsive to the indicating elements remaining in their accepted positions to eject the components into their receptacles] *associated with each receptacle for sensing whether the indicating element corresponding to said receptacle is in its accepted position and for ejecting the component associated therewith into the receptacle if said indicating element is in its accepted position.*

3. An apparatus according to claim 2 in which the *sensing and* ejecting means includes *an* electrically actuated fluid operable [plungers] *plunger* positioned above [the receptacles] *its associated receptacle,* and *a* [circuits controlling] *circuit completed by a corresponding indicating element in its accepted position for actuating* the [plungers including switches closed by their respective indicating elements] *plunger.*

4. An apparatus according to claim 3 in which some of the indicating elements may [close] *complete actuat-*

*ing circuits* other than their respective [switches] *circuits* while moving relative to the receptacles, and time delay units *are* disposed *respectively* in the *actuating* circuits to retard actuation of the plungers until the circuits are [closed] *completed* and [held closed] *maintained completed* by [the] *their* respective indicating elements *for a predetermined time.*

5. An apparatus for testing electrical components having external leads comprising a plurality of spaced test stations, shelves fixedly mounted adjacent the test stations, *a plurality of like first* electrical connectors fixedly mounted at given spaced positions [adjacent] *on* the shelves, a plurality of test units [each adapted to perform a] *for performing respective* predetermined [test] *tests* on each component, [and provided with like widths and] *said test units having* like [associate] *second* electrical connectors fixed thereto [at positions to interengage] *for connection with* any of the *first* electrical connectors so that the test units may perform their *respective* tests at any test station, holders for components and their leads, supports for the holders movable intermittently between intervals of rest to position the holders and components successively at the [successive] test [station] *stations,* [and] means at each test station to electrically connect the leads of [the] *a* component [therein] *thereat* to the *first* electrical connector [thereof through the associated electrical connector to include the components in circuits with the test units at any of the test stations] *associated with said test station* so that the test [sets] *set* may perform [their tests] *its respective test* on [the components at any selected test station] *said component, and a group of indicating elements mounted on each support, each element being individually movable between an accepted position and a rejected position in accordance with the results of the tests performed by the test units.*

6. An apparatus according to claim 5 in which guides are mounted on the shelves to locate the test units on the shelves adjacent their respective test stations and to assure correct connection of the [associate] *second* connectors with the *first* connectors at those stations.

7. An apparatus according to claim 5 [in which a group of indicating elements is mounted on each support, each element being movable individually between an accepted position and a rejected position as results of their respective tests], *further including a plurality of component* ejecting means *corresponding respectively to the indicating elements of each group and* disposed at positions spaced from the test stations, [a] *an operating* circuit for each ejecting means [responsive only to its respective indicating element of each support], and a circuit closing means for each circuit positioned to be closed only by [their respective] *a predetermined one of the* indicating [element to operate the ejecting means] *elements of each group.*

8. An apparatus for testing electrical components having external leads comprising a pair of spaced parallel endless chains extending around pairs of spaced sprockets to cause upper portions of the chains to travel forwardly in a given direction and to cause lower portions of the chains to travel in a return direction between like intervals of rests, a plurality of test stations disposed at given spaced positions adjacent the forward portions of the chains, supports extending laterally between the chains and having their ends secured to the chains to position the supports for successive alignment with the successive test stations during forward movement [with] *of* the chains, holders for the components and their leads mounted on the supports, shelves disposed adjacent the test stations and having supporting areas disposed in alignment with the test stations, *a plurality of like first* electrical connectors mounted in the supporting areas, electrical power supplies for the connectors, means disposed at the test stations to electrically connect the leads of the components to the *first* connectors, portable test units [adapted to perform varied tests on the components] receivable in the supporting areas [in any selected order, and associate connectors fixed to the test units and adapted for interengagement with the connectors at any supporting area and adjacent test station so that the test units will perform their tests on the components in a predetermined variable order] *for performing respective tests on the components, said test units having like second electrical connectors fixed thereto for connection with any of the first electrical connectors so that the test units can perform their respective test at any test station, and groups of indicating elements mounted on each support, each element being individually movable between a vertical accepted position and a lateral rejected position in accordance with the results of the test performed by the test units.*

[9. An apparatus according to claim 8 in which like groups of indicating elements for the different test units are mounted on all the supports so that the elements in each group on each support are mounted for individual movement between vertical accepted positions and lateral rejected positions, and means responsive to the test units when components fail to pass any of the different tests to move their respective indicating elements to the rejected positions.]

10. An apparatus according to claim 8 in which [like groups of indicating elements for the different test units are mounted for individual movement between vertical accepted positions and lateral rejected positions, means responsive to the test units when components fail to pass any of the different tests to move their respective indicating elements to the rejected positions, the indicating elements extending vertically upwardly in their accepted positions while moving in the forward direction will extend vertically downwardly while moving in the return direction with the lower portions of the chains,] *a plurality of* receptacles [for components having passed predetermined tests] *corresponding respectively to the indicating elements of each group are* disposed at spaced positions beneath the lower portion of the chain for alignment with *the* supports [thereon] *carried by said chain,* and means rendered effective by the indicating elements remaining in the accepted positions *are provided* to eject the components into the receptacles corresponding to [the results of their tests] *said indicating elements.*

*11. Apparatus in accordance with claim 8 in which said means to electrically connect the leads of the components to the first connectors includes a plurality of parallel conductive members disposed beneath the forward portion of the chains at each test station and electrically connected to the first connectors, and in which each of said supports has a plurality of conductive elements depending therefrom and engageable respectvely with the conductive members when the supports are located in the test stations.*

*12. Apparatus in accordance with claim 10 in which the indicating elements are conductive and the ejecting means include operating circuits which are completable through the conductive indicating elements to effect ejection of the components into the receptacles.*

*13. Apparatus for testing electrical components and for sorting the same into one of a plurality of groups in accordance with the results of the testing, which apparatus comprises, a plurality of successive test stations, a plurality of successive sorting stations, each sorting station corresponding to a group to which a component can belong, means for carrying components to be tested and sorted first into each of said test stations and thereafter into each of said sorting stations, said carrying means including a series of indicating elements for each of said components, each indicating element representing a group to which a component can belong and each being individually movable between an accepted and a rejected posi-*

*tion, means at each test station for testing a component presented thereto and for moving any of the indicating elements associated with said component to its rejected position if the results of the testing indicate that the component has failed to meet the requirements of the group represented by said indicating element, a component receiving receptacle at each sorting station, and means at each sorting station for sensing whether the indicating element corresponding to said sorting station is in its accepted or rejected position and for ejecting the component into the receptacle associated with said sorting station if said indicating element is in its accepted position.*

References Cited by the Examiner

The following references, cited by the Examiner, are of record in the patented file of this patent or the original patent:

UNITED STATES PATENTS

| | | | |
|---|---|---|---|
| 1,971,426 | 8/34 | Poole. | |
| 2,278,697 | 4/42 | Gould. | |
| 2,567,741 | 9/51 | Smith | 209—81 |
| 2,571,643 | 10/51 | Youhouse | 209—81 |
| 2,986,275 | 5/61 | Glaubke | 209—81 |
| 3,039,604 | 6/62 | Bickel et al. | 209—81 X |

ROBERT B. REEVES, *Primary Examiner.*